United States Patent Office 3,792,075
Patented Feb. 12, 1974

3,792,075
CARBONATE ESTERS OF AROMATIC HYDROXY CARBOXYLIC ACIDS
Hiroshi Kaminaka, Kobe, Norio Kotera, Amagasaki, Hiroshi Kuruma, Toyonaka, and Hideki Yanagihara, Takatsuki, Japan, assignors to Sumitomo Chemical Company, Limited, Osaka, Japan
No Drawing. Filed Nov. 29, 1971, Ser. No. 203,036
Claims priority, application Japan, Dec. 5, 1970, 45/107,732; Dec. 17, 1970, 45/114,372
Int. Cl. C07c 65/04, 69/00
U.S. Cl. 260—463    2 Claims

ABSTRACT OF THE DISCLOSURE

An aromatic polycarboxylic acid of the formula,

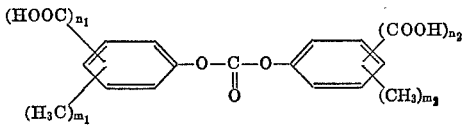

wherein $n_1$ and $n_2$ are individually zero or an integer of up to 2, and $n_1+n_2$ is 2 or more, $m_1$ and $m_2$ are individually zero or an integer of up to 2, and $n_1+m_1$ and $n_2+m_2$ do individually not exceed 3, and the substituted positions of the carboxyl groups are at the 3-, 4- or 5-positions of the individual phenyl groups, provided that, when $m_1$ and $m_2$ are individually zero, $n_1$ and $n_2$ are individually an integer of up to 2 and at least one carboxyl group is substituted at the 3-, 4- or 5-position of the individual phenyl groups. These compounds are useful as a starting material for producing polymeric materials or as an intermediate for producing, for example, aromatic hydroxycarboxylic acid derivatives.

This invention relates to novel aromatic polycarboxylic acids and their derivatives, and a process for producing the same. More particularly, the present invention relates to novel aromatic polycarboxylic acids represented by the formula,

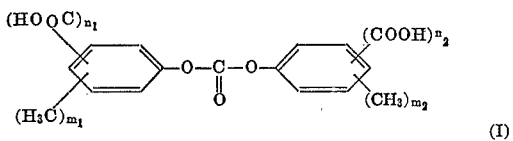

wherein $n_1$ and $n_2$ are individually zero or an integer of up to 2, and $n_1+n_2$ is 2 or more, $m_1$ and $m_2$ are individually zero or an integer of up to 2, and $n_1+m_1$ and $n_2+m_2$ do individually not exceed 3, and the substituted positions of the carboxyl groups are at the 3-, 4- or 5-positions of the individual phenyl groups, provided that, when $m_1$ and $m_2$ are individually zero, $n_1$ and $n_2$ are individually an integer of up to 2 and at least one carboxyl group is substituted at the 3-, 4- or 5-position of the individual phenyl groups.

The present aromatic polycarboxylic acids are novel compounds, which have not been disclosed yet in the known literatures. These aromatic polycarboxylic acids and their derivatives generally are colorless crystals having high melting points, which are stable against light and heat. Carbonate ester bonds being in the molecules are also relatively stable against hydrolysis. Owing to such excellent properties, these aromatic polycarboxylic acids are suitable as polycarboxylic acid components for polymeric materials of condensation system, or as a raw material for preparing polymeric materials such as unsaturated esters, epoxy esters, etc., or they are also useful as intermediates for preparing other useful materials, for example, aromatic hydroxycarboxylic acid derivatives.

The aromatic polycarboxylic acid represented by the Formula I, include such dicarboxylic acids as bis(m-carboxyphenyl) carbonate,
bis(p-carboxyphenyl) carbonate,
3,4'-dicarboxydiphenyl carbonate,
3,5-dicarboxydiphenyl carbonate,
bis(2-methyl-3-carboxyphenyl) carbonate,
bis(2-methyl-4-carboxyphenyl) carbonate,
bis(2-methyl-5-carboxyphenyl) carbonate,
bis(2,6-dimethyl-4-carboxyphenyl) carbonate,
bis(3-methyl-4-carboxyphenyl) carbonate,
2,2'-dimethyl-3,4'-dicarboxydiphenyl carbonate,
2,2'-dimethyl-3,5'-dicarboxydiphenyl carbonate,
2,2'-dimethyl-4,5'-dicarboxydiphenyl carbonate, etc.;

such tricarboxylic acids as 3,5,5'-tricarboxydiphenyl carbonate,
3,5,4'-tricarboxydiphenyl carbonate,
2-methyl-3,3'4'-tricarboxydiphenyl carbonate,
2-methyl-3,3',5'-tricarboxydiphenyl carbonate,
2-methyl-4,3',5'-tricarboxydiphenyl carbonate,
2-methyl-5,3',5'-tricarboxydiphenyl carbonate,
3-methyl-4,3',5'-tricarboxydiphenyl carbonate,
2,4-dimethyl-4,3',5'-tricarboxydiphenyl carbonate, etc.;

such tetracarboxylic acids as bis(3,5-dicarboxydiphenyl) carbonate,
bis(3,4-dicarboxyphenyl) carbonate,
bis(2,3-dicarboxyphenyl) carbonate,
bis(2,4-dicarboxyphenyl) carbonate,
bis(2,5-dicarboxyphenyl) carbonate,
2,3,3',4'-tetracarboxydiphenyl carbonate,
2,4,3',5'-tetracarboxydiphenyl carbonate, etc.

The aromatic polycarboxylic acid of the Formula I, can be prepared by oxidizing a polymethyldiphenyl carbonate represented by the formula,

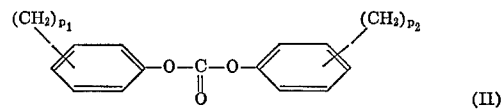

wherein $p_1$ and $p_2$ are individually zero or an integer of up to 3, $p_1+p_2$ is an integer of 2 or more, and at least two methyl groups are substituted at the 3-, 4- or 5-position of individual phenyl groups.

The polymethyldiphenyl carbonates represented by the Formula II can be readily prepared by reacting phenol and/or a specific isomer of methyl-substituted phenols or a mixture thereof with phosgene according to the well-known method.

Further, a mixed ester of specific structure, for example, 3,5-dimethyldiphenyl carbonate, can be obtained by reacting two kinds of phenols stagewise or by separating ti from the formed mixture. Of course, the starting material polymethyldiphenyl carbonate must have a structure corresponding to that of the desired aromatic polycarboxylic acid. It is necessary to use purified polymethyldiphenyl carbonate having a content of free phenols of 0.1% or less. When the desired aromatic polycarboxylic acid are a mixture, a mixture of starting material of carbonate esters can be used as such.

Polymethyldiphenyl carbonates can be oxidized with an oxidizing agent such as molecular oxygen, organic and inorganic peroxides, permanganates, bichromates nitric acid, ozone, halogen, halogenic acids, etc. In an industrial scale, it is advantageous to use molecular oxygen or an oxygen-containing gas such as air, etc. Particularly, the so-called "liquid phase autoxidation process," where a polymethyldiphenyl carbonate is oxidized in a solvent with an oxygen-containing gas, is one of the best modes for carrying out the present invention. The oxygen-containing gas used in the present invention must be prevented as much as possible from inclusion of an oxidation-inhibiting substance or a hydrolysis-promoting substance, for example, sulfur compounds, phenol compounds, water, strong acids and strong alkalis.

Reaction conditions for the oxidation reaction must be selected so that the rate of hydrolysis may be sufficiently lower than the rate of oxidation. In the oxidation of these compounds containing a carbonate ester bond in the molecules, the ester bond is relatively stable against the hydrolysis, but when these compounds are in contact with water for a long time under an excessively stringent condition, for example, under a strongly acidic or basic condition or at a higher temperature, the carbonate ester bond may be hydrolyzed, and the resulting phenolic substance gives a considerably unfavorable influence upon the oxidation reaction, and as a result a yield is inevitably lowered. To avoid these troubles, it is favorable to use an oxidizing agent in a substantially non-aqueous solvent. For example, a method in which the oxidation is conducted by using a permanganate in pyridine is recommended. Furthermore, it is an effective means for carrying out the present invention to remove water produced in the oxidation. Particularly, the removal of water is considerably effective for the production of aromatic polycarboxylic acid having more carboxylic groups such as tricarboxylic acid, tetracarboxylic acid, etc. For example, a method based on the removal of water includes an evaporative removal of water including azeotropic distillation, addition of a substance capable of reacting with water, for example, acetic anhydride, use of a substance capable of removing water by adsorption, for example, molecular sieve, etc.

The reaction temperature is in a range from room temperature to 200° C., preferably 60° to 150° C., to sufficiently repress the rate of hydrolysis and promote the oxidation reaction. The reaction pressure is advantageously in a range from atmospheric to increased pressure, and particularly preferably from atmospheric pressure to 30 kg./cm.² gage.

To promote the oxidation reaction, a heavy metal catalyst such as vanadium, manganese, cobalt, nickel, copper, molybdenum, etc. may be used. It is advantageous to use the catalyst in such a state that it can be uniformly dissolved or dispersed in the reaction system. It is also effective for carrying out the present invention to use as a promoter a halogen compound such as a bromine compound, etc., a carbonyl compound such as acetaldehyde, methylethylketone, etc., various peroxides such as benzoyl peroxide, peracetic acid, hydroperoxide, etc., or ozone, etc. at the same time.

The solvent for oxidation reaction is selected from inert compounds capable of uniformly dissolving or dispersing the raw material carbonate ester and the catalyst. For example, lower aliphatic carboxylic acids or their acid anhydrides are preferable.

The reaction time depends upon the kinds of the raw material carbonate esters and other reacting conditions, but the reaction time is properly from about 4 to 24 hours, excluding an induction period. By properly selecting the reaction conditions, the reaction can be substantially finished within this period of time. It is possible to interrupt the oxidation while the reaction is not finished, but separation and recovering operation of the raw material carbonate esters and partially oxidized substances from the oxidation mixture are complicated.

Polymethyldiphenyl carbonate methyl groups of which are located at the 3rd, 4th or 5th position can be well oxidized, but those methyl groups of which are located at the 2nd or 6th position have a retarded rate of oxidation due to a steric hindrance, and are regarded as being substantially not oxidized by the present process.

When two methyl groups in polymethyldiphenyl carbonate are substituted at the 3- and 4-positions of the same phenyl group, the 4th positioned methyl group is more readily oxidized.

Separation of products from the reaction mixture can be relatively readily carried out. Since the aromatic polycarboxylic acid are relatively insoluble, most of the acid can be recovered by filtration after the completion of the oxidation. Products dissolved in the filtrate can also be recovered from the filtrate.

The aromatic polycarboxylic acid of the Formula I can also be prepared by reaction of aromatic hydroxycarboxylic acid represented by the following formula,

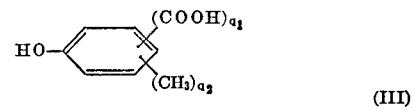

(III)

wherein $q_1$ is an integer of 1 or 2, $q_2$ is zero or an integer of 1 or 2 and at least one carboxyl group is substituted at the 3-, 4- or 5-position of the phenyl group when $q_2$ is zero, and the substituted positions of the carboxyl group are at the 3-, 4- or 5-positions of the individual phenyl group when $q_2$ is an integer of 1 or 2, with phosgene.

The starting material of aromatic hydroxycarboxylic acids are synthesized by various processes in an industrial scale. Of course, it is necessary to select the starting material of aromatic hydroxycarboxylic acid having a structure corresponding to that of the desired aromatic polycarboxylic acid. For example, when bis(p-carboxyphenyl) carbonate is to be prepared, p-hydroxybenzoic acid must be used as a starting material. When the desired product is a mixture, the starting aromatic hydroxycarboxylic acids may be a mixture. For example, when a mixture of m-hydroxybenzoic acid and p-hydroxybenzoic acid is used as a starting material, a mixture of these isomers, such as bis(m-carboxyphenyl) carbonate, 3,4'-dicarboxydiphenyl carbonate and bis(p-carboxyphenyl) carbonate, can be obtained.

The reaction of aromatic hydroxycarboxylic acids with phosgene is carried out in an aqueous alkaline solution of aromatic hydroxycarboxylic acids. It is preferable to use a hydroxide of alkali metal as an alkaline substance, and though an amount of the alkaline substance to be used depends upon the structure of the aromatic hydroxycarboxylic acid, it is necessary to use at least $q_1$ gram-equivalent, preferably $q_1+0.5$ to $q_1+2.5$ gram-equivalent, of the alkaline substance per mole of the aromatic hydroxy-carboxylic acid represented by the Formula III. Concentration of the aromatic hydroxycarboxylic acid in a aqueous alkaline solution may be 0.001 to 4 moles, preferably 0.01 to 2 moles per liter of the solution. In the case of too low concentration, the volume of a reactor must be made excessively larger, and the process becomes economically disadvantageous. On the other hand, in the case of too high concentration, more amount of reaction products are deposited, and the stirring is difficult to continue. Finally, smooth progress of the reaction is interrupted.

The reaction temperature is in a range from $-5°$ to 100° C., preferably from 10° to 60° C.

Phosgene is supplied to the reaction system in a gaseous or liquid state. It is necessary to supply the theoretical amount, that is, 0.5 mole or more of phosgene per mole of the aromatic hydroxycarboxylic acid. However, the use of excessive large amount of phosgene is not preferable in either economical or safety sense. Phosgene can be supplied in view of a pH of the reactant solution. That is to say, a pH of the reactant solution is 10 or higher at the start of the reaction, but a pH is lowered with supply of phosgene. When a pH reaches 8 or lower, it is judged that phosgene has been sufficiently supplied. When phosgene is further supplied a pH of the reactant solution is further lowered, and when a pH is lower than 2, undesirable side reactions remarkably take place. Therefore, it is preferable to stop the supply of phosgene in a pH range of from 8 to 2.

The reaction time depends upon the apparatus and process for the reaction and other reaction conditions, but is in a range of from about 5 minutes to 24 hours, preferably about 15 minutes to 6 hours.

With the progress of reaction, the product aromatic polycarboxylic acid or its salt is deposited, and the resulting reaction mixture turns to a system of a mixture of solid and liquid. To sufficiently carry out the reaction of unreacted starting material accompanying the solid, it is better to use such an expedient as vigorous stirring or the use of a surfactant.

Separation of the product from the resulting reaction mixture can be readily carried out by such a means as filtration or extraction by a solvent. To sufficiently isolate the aromatic polycarboxylic acid before the separation, it is better to adjust a pH to 7 or lower, preferably 5 to 2. The product obtained by the separation can be purified, if necessary, by recrystallization or other means.

The aromatic polycarboxylic acid obtained according to the present process is generally white, light, tasteless and odorless crystals, and is relatively insoluble in cold water, cold alcohol and ethers, but readily soluble in such organic polar solvents as dimethylformamide, dimethylsulfoxide, dimethylacetamide, etc. and hot water and hot alcohol. Each of the carboxyl groups of the aromatic polycarboxylic acid shows a reactivity similar to that of an ordinary carboxyl group, and can derive esters, acid halides, acid amides, acid anhydrides, etc. Therefore, these aromatic polycarboxylic acids can be widely utilized as a polycarboxylic acid component for synthetic polymer, or as raw materials for plasticizer, surfactants or other chemical products.

The carbonate ester bond in the aromatic polycarboxylic acid undergoes hydrolysis in the presence of a strongly acidic or basic substance at a high temperature, whereby the corresponding aromatic hydroxycarboxylic acids are formed. Therefore, the aromatic polycarboxylic acids are also important as an intermediate for the production of the aromatic hydroxycarboxylic acid derivatives.

The present invention will be explained in detail, referring to examples, wherein parts and percentage are by weight unless otherwise specified:

EXAMPLE 1

500 parts of metacresol was dissolved in 2,500 parts of water containing 195 parts of sodium hydroxide in a dissolved state, and 240 parts of phosgene was blown therein at 40° C. After cooling, deposited solids were filtered off, and dissolved in 1,400 parts of toluene. After alkali washing and water washing, toluene was distilled off. The residue was recrystallized from ethanol, whereby 540 parts of bis(m-tolyl) carbonate was obtained. 300 parts of bis(m-tolyl) carbonate and 25 parts of cobalt acetate were dissolved in 2,700 parts of acetic acid, and oxidized at a temperature of 85° to 90° C. under a pressure of 0.5 kg./cm.² for 12 hours, while supplying 1 liter/min. of air and 4 cc./hr. of acetaldehyde per liter of the reactant solution, and the raw material bis(m-tolyl) carbonate almost disappeared.

The reaction mixture was cooled and then filtered, whereby 320 parts of solid matters were obtained. The filtrate was passed through an ion exchange resin to remove cobalt, and then a low boiling fraction was distilled off, whereby 58 parts of residue was obtained. The solid matters were washed with hot acetic acid and recrystallized from ethanol, whereby white crystals having a melting point of 261° C. were obtained. Elemental analysis of the crystals is given below:

Found (percent): C, 59.72; H, 3.40. Calculated for $C_{15}H_{10}O_7$ (percent): C, 59.61; H, 3.34.

By the nuclear magnetic resonance spectrum of the crystals in dimethyl sulfoxide, it was confirmed that the peak of $\delta = 2.36$ p.p.m. of the raw material disappeared and the peak around $\delta = 7.2$ p.p.m. was shifted to about 7.8. The compound was found to be bis(m-carboxyphenyl) carbonate.

By the nuclear magnetic resonance spectrum analysis, it was found that the evaporation residue of the filtrate contained unoxidized methyl groups. It was found that the residue was a mixture of 3-carboxy-3-methyldiphenyl carbonate, where one of the methyl groups of the starting material bis-(m-tolyl) carbonate was oxidized, and bis(m-carboxyphenyl) carbonate.

According to the procedure similar to that mentioned above, bis(p-carboxyphenyl) carbonate, M.P. 260° C., (decomposed) was obtained.

EXAMPLE 2

400 parts of a 10% aqueous solution of hydrochloric acid was added to 100 parts of bis(m-carboxyphenyl) carbonate obtained in Example 1, and the mixture was stirred under a sealed state at 150° C. for 10 hours. By opening a valve at every 2 hours while stirring, pressure was adjusted. The reaction mixture was cooled, and 86 parts of deposited crystals of m-hydroxybenzoic acid was obtained, and 4 parts of slightly colored m-hydroxybenzoic acid was recovered from the filtrate through extraction with methylisobutylketone.

EXAMPLE 3

20 parts of m-hydroxybenzoic acid and 12.2 parts of sodium hydroxide were dissolved in 100 parts of water and 8 parts of phosgene in a gaseous state was blown therein with stirring at a temperature of 40° C. for 30 minutes, whereby a pH was adjusted to about 7, and the product was brought in a slurry state. Further, the mixture was stirred for 15 minutes, and then the solid matters were filtered. By repetition of water washing of the filtered solid matters, 8.4 parts of sparingly water-soluble crystals were obtained. The crystals were white and light and had a melting point of 262° C. Elemental analysis of the crystals is given below:

Found (percent): C, 59.55; H, 3.25. Calculated for $C_{15}H_{10}O_7$ (percent): C, 59.61; H, 3.34.

It was confirmed from the above result that the crystals consisted of bis(m-carboxyphenyl) carbonate.

Further, dilute hydrochloric acid was added to said washing solution to adjust pH to 2.5, whereby white crystals were deposited. The deposits were filtered and recrystallized from 95% alcohol, whereby 6.5 parts of crystals of bis(m-carboxyphenyl) carbonate having a melting point of about 260° C. were obtained.

According to the procedure similar to that mentioned above, bis(p-carboxyphenyl) carbonate, M.P. 260° C. (decomposed) was obtained.

EXAMPLE 4

10 parts of m-hydroxybenzoic acid and 8.6 parts of potassium hydroxide were dissolved in 300 parts of water, and admixed with 6 parts of liquid phosgene dropwise over a period of one hour at 35° C. while stirring the solution. pH of the solution was adjusted to about 2. Further, stirring was continued at 40° C. for 15 minutes and the deposited solid matters were filtered, and washed with water, whereby 8.0 parts of white crystals were obtained. The crystals had a melting point of 260° C. and was confirmed to be bis(m-carboxyphenyl) carbonate.

What is claimed is:

1. A compound of the formula,

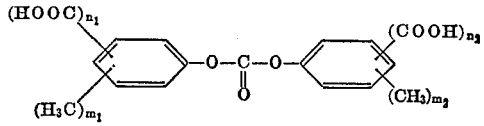

wherein $n_1$ and $n_2$ are individually zero or an integer of up to 2, and $n_1+n_2$ is 2 or more, $m_1$ and $m_2$ are individually zero or an integer of up to 2, and $n_1+m_1$ and $n_2+m_2$ do individually not exceed 3, and the substituted positions of the carboxyl groups are at the 3-, 4- or 5-position of the individual phenyl groups, provided that, when $m_1$ and $m_2$ are individually zero, $n_1$ and $n_2$ are individually an integer of up to 2 and at least one carboxyl group is substituted at the 3-, 4- or 5-position of the individual phenyl groups.

2. A compound of the formula,

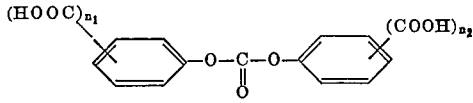

wherein $n_1$ and $n_2$ are individually an integer of up to 2 and at least one carboxyl group is substituted at the 3-, 4- or 5-position of the individual phenyl groups.

References Cited

UNITED STATES PATENTS

| | | | |
|---|---|---|---|
| 3,272,750 | 9/1966 | Chase | 252—99 |
| 1,877,304 | 9/1932 | Grether | 260—463 |
| 2,189,205 | 2/1940 | Grether et al. | 260—463 |
| 2,379,251 | 6/1945 | Muskat et al. | 260—484 |
| 3,642,866 | 2/1972 | Witt et al. | 260—473 G |
| 2,228,920 | 1/1941 | Eckert et al. | 260—521 |
| 2,790,010 | 4/1957 | Shepard | 260—626 |
| 2,794,813 | 6/1957 | Farinacci | 260—376 |
| 3,275,674 | 9/1966 | Bottenbruch et al. | 260—463 |
| 3,660,477 | 5/1972 | Otterbach et al. | 260—524 R |

FOREIGN PATENTS 647,546  8/1962  Canada.

LEWIS GOTTS, Primary Examiner
D. G. RIVERS, Assistant Examiner

U.S. Cl. X.R.

260—47 R, 47 C, 521 R